United States Patent [19]

Pazzaglia

[11] Patent Number: 5,237,147
[45] Date of Patent: Aug. 17, 1993

[54] ELECTRONIC DEVICE FOR CONTROLLING AND MONITORING THE ELECTRICAL POWER SUPPLY TO RESISTANCE WELDING EQUIPMENT IN PARTICULAR AS USED IN THE MANUFACTURE OF CANS

[75] Inventor: Luigi Pazzaglia, Bologna, Italy
[73] Assignee: Cefin S.p.A., Bologna, Italy
[21] Appl. No.: 812,807
[22] Filed: Dec. 24, 1991

[30] Foreign Application Priority Data

Dec. 27, 1990 [IT]  Italy ................................ 3790 A/90

[51] Int. Cl.$^5$ ............................................. B23K 11/24
[52] U.S. Cl. ................................................... 219/108
[58] Field of Search ................. 219/137 PS, 130.32, 219/108, 110

[56] References Cited

U.S. PATENT DOCUMENTS

| | | | |
|---|---|---|---|
| 4,192,987 | 3/1980 | Kawano | 219/137 PS |
| 4,503,316 | 3/1985 | Murase et al. | 219/130.32 |
| 4,554,430 | 11/1985 | Belamaric | 219/108 |
| 4,654,503 | 3/1987 | Tajiri | 219/110 |
| 4,675,494 | 6/1987 | Dilay | 219/91.21 |
| 4,721,841 | 1/1988 | Pazzaglia et al. | 219/110 |
| 4,973,815 | 11/1990 | Ito et al. | 219/110 |
| 5,045,658 | 9/1991 | Smith | 219/10.55 B |

FOREIGN PATENT DOCUMENTS 404094879A  3/1992  Japan .................................. 219/110

Primary Examiner—Steven L. Stephan
Assistant Examiner—B. Davidson
Attorney, Agent, or Firm—Banner, Birch, McKie & Beckett

[57] ABSTRACT

An electronic device for controlling and monitoring the electric power supply to welding equipment includes an inverter driven by a rectifier that supplies voltage to the primary winding of a welding transformer. A secondary winding of the welding transformer delivers welding current that is a function of the voltage applied to the primary winding. The inverter is also interlocked to and piloted by a regulator in such a way that an essentially square wave voltage signal appears with a succession of paired pulses in each half-period of the fundamental frequency, alternately positive and negative and of a given absolute crest value and finite spacing. A periodic welding current is produced of which the pulses are triangular, all positive or negative within the same half-period, and geared to rise and fall once during each cycle of two paired alternating voltage pulses, such that fundamental frequencies can be reduced without loss of operating speed.

12 Claims, 2 Drawing Sheets

ELECTRONIC DEVICE FOR CONTROLLING AND MONITORING THE ELECTRICAL POWER SUPPLY TO RESISTANCE WELDING EQUIPMENT IN PARTICULAR AS USED IN THE MANUFACTURE OF CANS

BACKGROUND OF THE INVENTION

The invention relates to an electronic device for controlling and monitoring the electrical power supply to resistance welders, and is intended in particular for application in the field of resistance welding equipment equipped with rollers as used to join the overlapped longitudinal edges of tin cans and similar articles.

Conventionally, it is of crucial importance in this particular type of equipment to provide a system of supplying electrical power to the welding rollers in order to produce a weld exhibiting no breaks in continuity, devoid of spits, and of dimensions and quality remaining as constant as possible over time. In addition, the weld must conform to given specifications, for example, longitudinal and transverse dimensions and depth repeated identically in each single weld.

There are various power supply devices currently embraced by the art field in question, all aimed at achieving the objects mentioned above, in which the relevant electrical and electronic technology has been developed to greater or lesser degrees. One of the more significant solutions, leading in the first instance to higher welding speeds and by extension to the achievement of increased output in production, was that obtained by exploiting a sine wave type alternating current supplied at frequency increasing commensurately with the required welding speed; rotary or static frequency converters often appear in such systems. This type of device has several drawbacks however, including a tendency of the equipment to generate excessive heat, not least the power supply transformer and adjacent parts, which results in somewhat high levels of energy consumption and increased cooling requirements.

A second type of solution, designed to obviate the drawbacks mentioned above, uses alternating current not of sine waveshape but of an essentially square waveshape which affords undoubted advantages over the sine wave current: transmission of power to the welded material is more regular, and lower values of current amplitude and frequency can be adopted, thus considerably reducing the tendency of the equipment to overheat and saving on the energy consumed in welding, and in cooling the equipment.

By comparison, in effect, the square wave current rises swiftly to its crest value, and not after approximately one quarter of the period as in the case of the sine wave.

Nonetheless, the advantages of this solution are compromised inasmuch as the relative equipment is complex, and must also be oversized if the slope of the square wave welding current is to be maximized to best advantage.

If the slope is made sufficiently steep, in fact, inversion of the welding current will occur in a negligible interval of time, which in turn leads to a lower operating frequency.

This is indead one of the most important technical aims to be pursued in resistance welding, namely, the facility of operating with current of lower and lower frequency at undiminished levels of output, as it provides the solution to all those problems associated in particular with electric losses, for example eddy currents; such losses occur in direct proportion to the inductive phenomena underlying inductive reactances, which becomes increasingly high with higher welding frequencies.

Further notable advantages have been gained from a system that features a single static converter comprising a single rectifier and stabilizer module by which continuous voltage is supplied to a fully transistorized inverter supplying the power input to the welding transformer.

In accordance with the developments outlined thus far, the transformer will naturally incorporate structure capable of ensuring a suitably swift current inversion, and to minimizing electric losses.

The inverter is governed by an electronic regulator designed to compare the amplitude and frequency of the welding current with fixed reference values and thereupon to pilot the operation of the inverter in such a manner that the value of the output voltage will be as needed to produce the requisite current.

In this system, the waveform of the welding current is obtained by voltage regulation and dependent on proportioning of the transformer, and the selected amplitude value arrived at in the shortest interval possible commensurate with the selected transformer dimensions. Once the required amplitude is reached, the first pulse ceases and the current diminishes, according to a given time constant, to the point at which a further pulse is generated to recharge the circuit, and so on until the positive or negative state is reversed. Thus, the waveform produced in one half-period of the current exhibits a series of interconnected peaks, occurring at least around the crest value, which correspond to the weld spots.

The drawback most frequently occurring in this instance, however, is that the current peaks are not directly controlled and thus appear dissimilar to one from another; this reduces the quality of the weld, in which the spots are neither uniform in size and consistency nor distributed evenly along the lapped and joined edges.

Even with this last system, moreover, the welding current will always carry a continuous component, which gives rise to spits.

SUMMARY OF THE INVENTION

It is a object of the present invention to provide an electronic device which produces a welding current having a waveform that ensures that the lapped longitudinal edges of cans or similar metal fabrications can be joined without exhibiting the defects mentioned above. It is a further object of the present invention to provide a device that enables operation at high welding speeds without the problems of overheating.

The stated objects are realized in an electronic device for controlling and monitoring the supply of electrical power to resistance welding equipment, according to the present invention. Such a device is intended in particular for use with equipment as employed for welding cans and similar metal goods. The device is of the type basically comprising a rectifier unit, an inverter unit driven by the rectifier unit, a welding transformer of which the primary winding is in receipt of the output voltage Vt supplied by the inverter unit and the output welding current Is is a function of the input voltage Vt, and a regulator unit to which the inverter unit is interlocked.

In the device disclosed, the regulator unit is able to pilot the operation of the inverter unit in such a way that the voltage signal Vt supplied to the welding transformer exhibits a plurality of twinned or paired pulses essentially of stepped profile in each half-period T/2 of its fundamental frequency, alternating between positive and negative. The voltage Vt has previously selected maximum or crest value Yv and finite duration $\tau$, thereby ygenerating a periodic welding current Is of predetermined absolute peak value Yi, having a waveform which for each pair of the stepped pulses registering in the voltage Vt exhibits one triangular pulse corresponding in value to the selected peak value Yi. The triangular pulse consists of the sum of two ramps. The first ramp rises from zero to the peak value Yi in a finite time of prescribed duration. The second ramp falls from peak value Yi back to zero, departing from the point of termination of the rise and occurring in a finite time likewise of prescribed duration $\tau'$.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
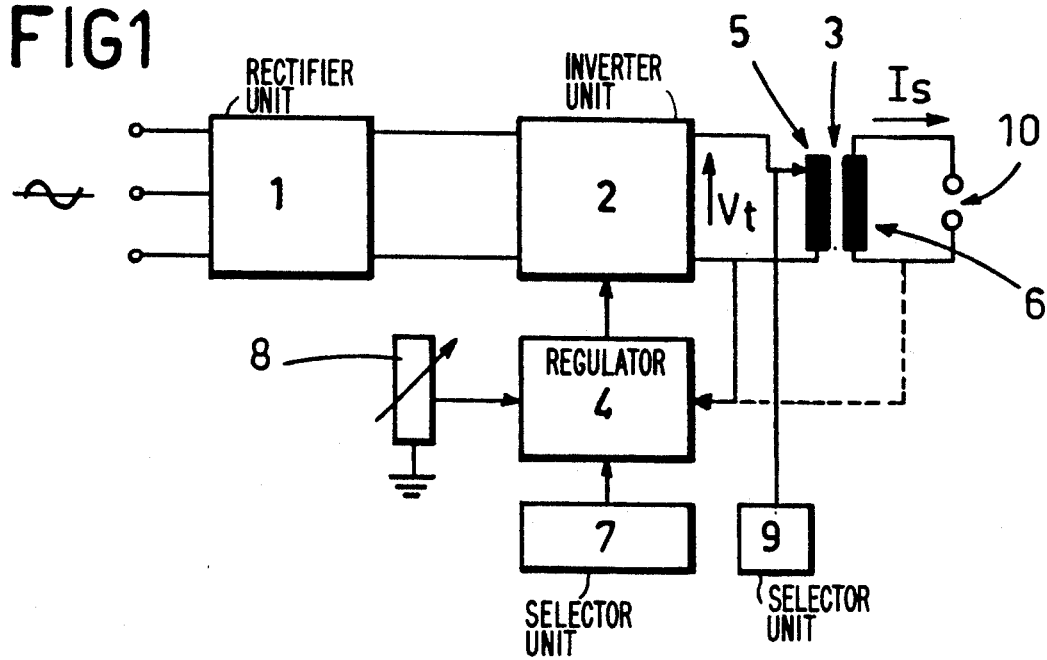
FIG. 1 is a block diagram of the electronic device according to the invention.

With reference to the drawings, the invention relates to equipment consisting essentially in a rectifier unit 1, a fully transistorized inverter unit 2 of which the input is driven by the output from the rectifier unit 1, a welding transformer 3 of which the primary winding 5 is in receipt of an input voltage Vt from the inverter unit, and a pair of welding rollers 10 supplied by the transformer with a welding current Is that is a function of the input voltage Vt.

The inverter uit 23 is interlocked to and piloted by an electronic regulator 4, typically in receipt of a feedback signal from the primary winding 5 or the second winding 6 of the transformer 3. The feedback signal is compared at least with amplitude and frequency reference values from a source shown schematically by the block denoted 8.

An original feature of the device disclosed is that it further comprises a first switching or selector unit 7 controlling the inverter unit 2 and a second selector unit 9 controlling the primary winding 5 of the transformer 3. The functions of the selector units 7 and 9 are described below.

The regulator unit 4 is able to pilot the inverter unit 2 by operating the inversion logic circuits, exciting the transistors to allow conduction or blocking as appropriate, in such a way that the voltage Vt signal supplied to the transformer 3 comprises a plurality of twinned or paired pulses substantially of stepped profile, denoted s in the drawings, occurring within each half-period T/2 of the fundamental frequency. The single pulse s is generated alternately positive and negative with a selected maximum or crest value Yv, the interval of its duration being a finite time denoted $\tau$.

The paired pulses s are of value and distribution within the half-period T/2 such that the welding current Is is rendered periodic and of selected absolute peak value Yi. The current waveform in each half-period T/2 of its fundamental frequency comprises one pulse of triangular profile g to each pair of the stepped pulses s in the input voltage Vt. The triangular pulse g may be considered substantially as the sum of two ramps. The first ramp rises from zero to peak value Yi, occurring in the finite time denoted $\tau$.

The second ramp falls from the termination of the rise, i.e. from the peak value Yi, back to zero, which occurs in a finite time denoted $\tau'$. Clearly enough, the fall time $\tau'$ and the rise time $\tau$ need not necessarily be identical.

The first selector unit 7 is capable of controlling and monitoring a set number of paired pulses s, and their constantly repeated duration $\tau$, generated with a voltage Vt per half-period T/2 of the relative fundamental frequency by the inverter unit 2 as determined by the regulator unit 4 (which pilots the inversion logic as aforementioned), which will be selected according to the number of triangular pulses g the user wishes to obtain in the welding current Is, likewise for each half-period T/2 of the relative fundamental frequency.

As discernible from the drawings, the triangular pulses g making up the waveform of the welding current Is are all positive or all negative in each half-period T/2 of the fundamental frequency.

Figure 3:
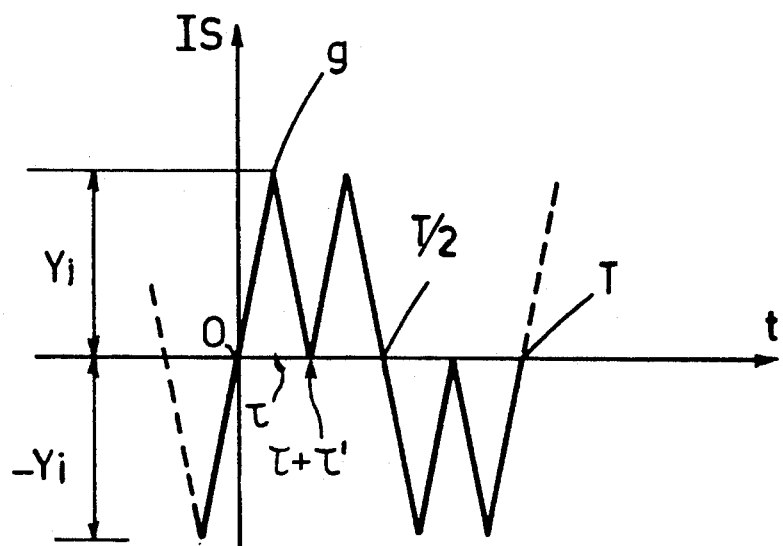
FIG. 3 illustrates the current generated by the secondary winding of the transformer in a device according to the invention.
Figure 5:
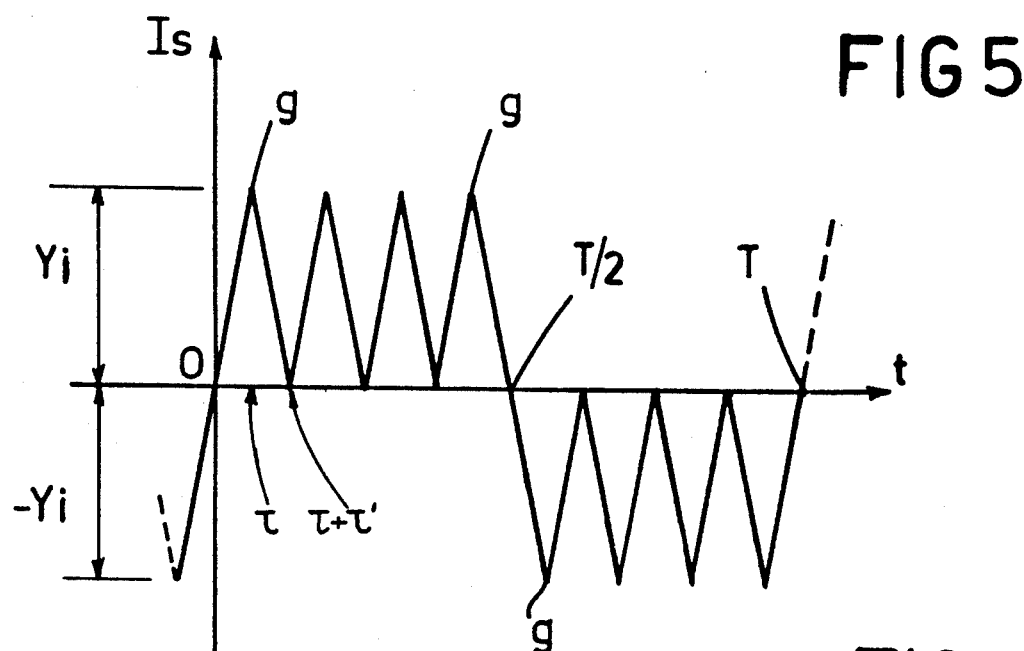
FIG. 5 illustrates the current generated by the secondary winding of the transformer, with voltage as in FIG. 4 supplied to the primary winding.

In the examples of FIGS. 3 and 5, each triangular pulse g of the welding current Is exhibits a first ramp, departing from base level and rising to the peak value Yi, which is of duration $\tau$ equal to the duration $\tau'$ of the second ramp, or fall to base level, departing from the point of termination of the first ramp at Yi. In this particular instance, assuming zero 0 as a reference and evaluating the first triangular pulse g, it will be observed that the pulse is of peak value Yi and can be considered substantially as the sum of two ramps, the first a rise with a slope of absolute value Yi/$\tau$, applied at the instant t=0, and the second fall with slope $-2$Yi/$\tau$, applied at the instant t=$\tau$.

In another example not illustrated in the drawings, the waveform might be one wherein at least the fall ramp comprises at least first and second portions of dissimilar slope; such a solution would permit of adjusting the form factor by selecting a lower peak value to obtain the same r.m.s. value.

Figure 2:
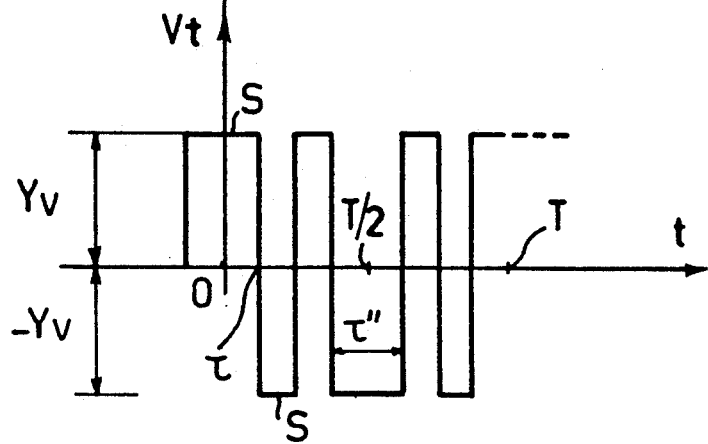
FIG. 2 illustrates the output voltage signal from the inverter unit of a device as in FIG. 1.
Figure 4:
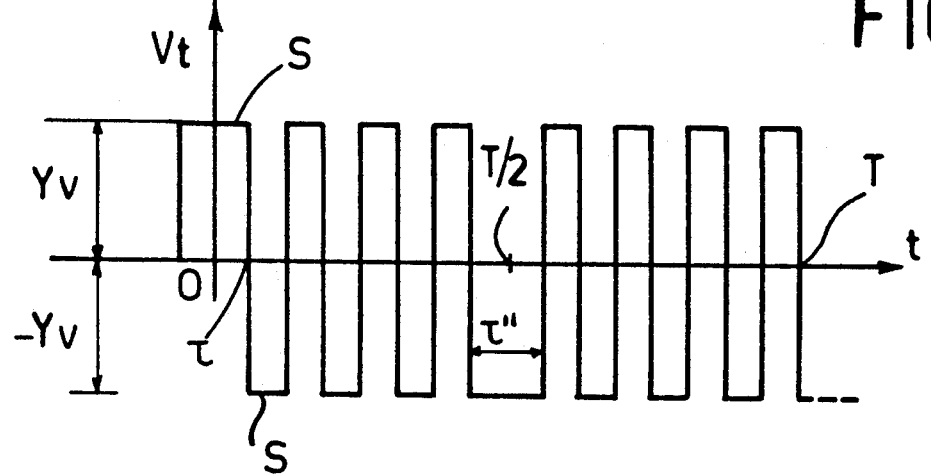
FIG. 4 illustrates the output voltage signal from the inverter of a device as in FIG. 1, though with a fundamental frequency different to that of FIG. 2.
Figure 6:
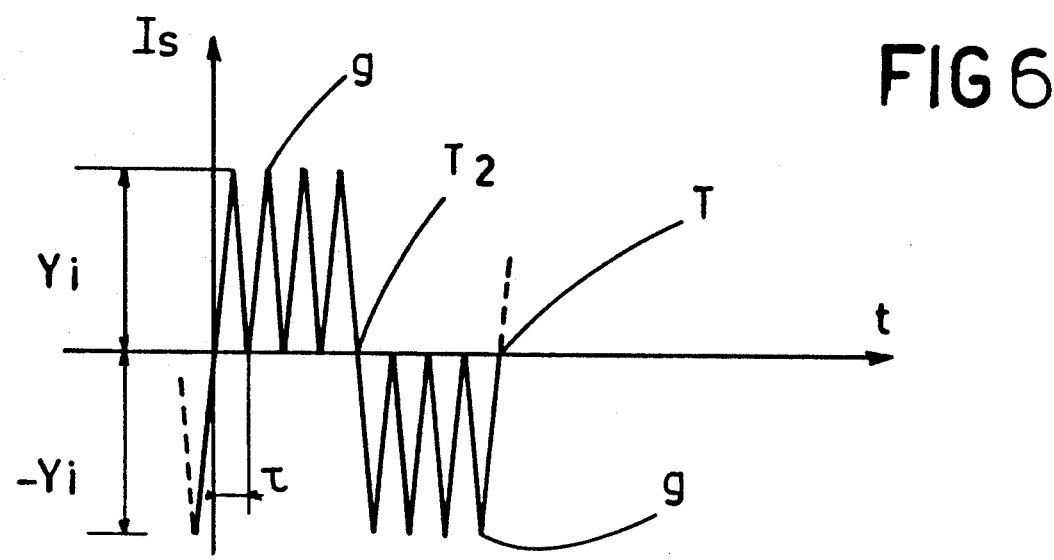
FIG. 6 shows a current generated by the secondary winding of the transformer which has a fundamental frequency as in FIG. 3 but with a greater number of pulses.

To reiterate, the first selector unit 7 can be used to program different numbers of pulses s of finite duration $\tau$ per half-period T/2 of the voltage Vt supplied by the inverter unit 2. In the example of FIGS. 4 and 5 for instance, the number of pulses s is doubled in relation to that of FIGS. 2 and 3; the waveform of the welding current Is thus obtained exhibits a greater number of triangular pulse g in each half-period T/2 of the fundamental frequency, and the fundamental frequency 1/T itself is halved.

At this juncture, the advantages of the invention and their great importance will be clear enough, inasmuch as halving the fundamental frequency has the effect of halving the frequency at which the magnetic flux is inverted, hence of reducing losses and attenuating the tendency of the equipment to overheat. With regard to the welding speed of the equipment, moreover, it should be stressed that by reducing a fundamental frequency 1/T to half of the formerly adopted for a given operating speed, as in the case of FIGS. 4 and 5, the welding speed can be increased and even doubled without exceeding the former fundamental frequency.

Naturally, at the particular moment when inversion of the welding current Is takes place, the interval of finite time $\tau''$ compassing the relative pulse of the voltage Vt will be of duration greater than the finite time $\tau$ of the individual pulse s within the context of the pair, and more exactly, of duration such as to allow the inversion of the corresponding triangular pulse g of the welding current Is and its subsequent rise to peak value Yi.

As regards the second selected unit 9 of the device disclosed (connected, it will be recalled, to the primary winding 5 of the welding transformer 3), this serves to select the turns ratio n=n1/n2. Thus, it is possible to vary the crest value Yv and the finite duration $\tau$ of the pulses s of the input voltage Vt to alter the number of triangular pulses g generated in each corresponding half-period T/2 of the welding current Is, for a given fundamental frequency.

Accordingly, an increased or diminished number of turns of the primary winding 5 of the transformer 3 can be made to correspond to a greater or lesser number of pulses g occurring in one half-period T/2 of the welding current Is.

What is claimed:

1. A welding power supply circuit for supplying power to resistance welding equipment, comprising:
    a rectifier for rectifying an alternating current signal to generate a rectified signal;
    an inverter, receiving the rectified signal, for generating an inverter output signal;
    a regulator for controlling said inverter to generate an inverter output signal having a plurality of pairs of square-wave voltage pulses in each of a first half-period and a second half-period, wherein each pair of square-wave voltage pulses in said first half-period comprises a first square-wave voltage pulse having a first polarity and a second square-wave voltage pulse having a second polarity, and each pair of square-wave voltage pulses in said second half-period comprises a first square-wave voltage pulse having the second polarity and second square-wave voltage pulse having the first polarity; and
    a welding transformer having a primary winding that receives the inverter output signal and secondary winding for supplying a welding current to resistance welding equipment, whereby the welding current includes a triangular pulse having the first polarity and originating at zero that corresponds to each pair of square-wave voltage pulses of the first half-period of the inverter output signal and a triangular pulse having the second polarity and originating at zero that corresponds to each pair of square-wave voltage pulses of the second half-period of the inverter output signal.

2. The welding power supply circuit according to claim 1, wherein each triangular pulse of the first polarity and each triangular pulse of the second polarity comprise a first substantially linear portion extending from zero to a maximum magnitude and having a duration t, and a second substantially linear portion extending from the maximum magnitude to zero and having a duration t'.

3. The welding power supply circuit according to claim 2, wherein the duration t and the duration t' are substantially equal.

4. The welding power supply circuit according to claim 2, wherein the duration t and the duration t' are not substantially equal.

5. The welding power supply circuit according to claim 1, wherein each of the square-wave voltage pulse pairs have a duration t, and further comprising a pulse control coupled to said regulator for controlling a number of square-wave voltage pulse pairs in the first and second half-periods.

6. The welding power supply circuit according to claim 1, wherein the first square-wave voltage pulses in said first and second half-period have a first duration and the second square-wave voltage pulses in said first and second half-periods have a second duration, the first duration being greater than the second duration.

7. The welding power supply circuit according to claim 1, further comprising a controller coupled to said welding transformer for controlling the ratio of turns between said primary winding and said secondary winding, thereby controlling a duration and an amplitude of the pairs of square-wave voltage pulse and of the triangular pulses of the welding current.

8. The welding power supply circuit according to claim 1, further comprising a reference signal source for generating a reference signal, wherein said regulator receives the reference signal and a feedback signal from at least one of said primary winding and said secondary winding and generates a control signal for controlling said inverter from the reference signal and the feedback signal.

9. The welding power supply circuit according to claim 8, wherein each of the square-wave voltage pulse pairs has a duration t, and further comprising a pulse controller coupled to said regulator for controlling a number of square-wave voltage pulse pairs in the first and second half-periods.

10. The welding power supply circuit according to claim 9, further comprising a controller coupled to said welding transformer for controlling the ratio of turns between said primary winding and said second winding, thereby selecting the duration t and an amplitude of the square-wave voltage pulse pairs and of the triangular pulses of the welding current.

11. The welding power supply circuit according to claim 10, wherein said regulator is coupled to said primary winding for receiving the feedback signal.

12. The welding power supply circuit according to claim 10, wherein said regulator is coupled to said secondary winding for receiving the feedback signal.

* * * * *